W. H. SMITH.
Vapor Burner.

No. 9,227. Reissued June 1, 1880.

Witnesses.
James P. Foster.
Jonah T. Bowyer.

Inventor.
William H. Smith

N. PETERS, PHOTO-LITHOGRAPHER, WASHINGTON, D. C.

UNITED STATES PATENT OFFICE.

WILLARD H. SMITH, OF BROOKLYN, NEW YORK.

VAPOR-BURNER.

SPECIFICATION forming part of Reissued Letters Patent No. 9,227, dated June 1, 1880.

Original No. 55,383, dated June 5, 1866. Application for reissue filed April 7, 1880.

*To all whom it may concern:*

Be it known that I, WILLARD H. SMITH, of the city of Brooklyn, State of New York, have invented a new and useful Improvement in Vapor-Burners, of which the following is a specification.

Figure 1:
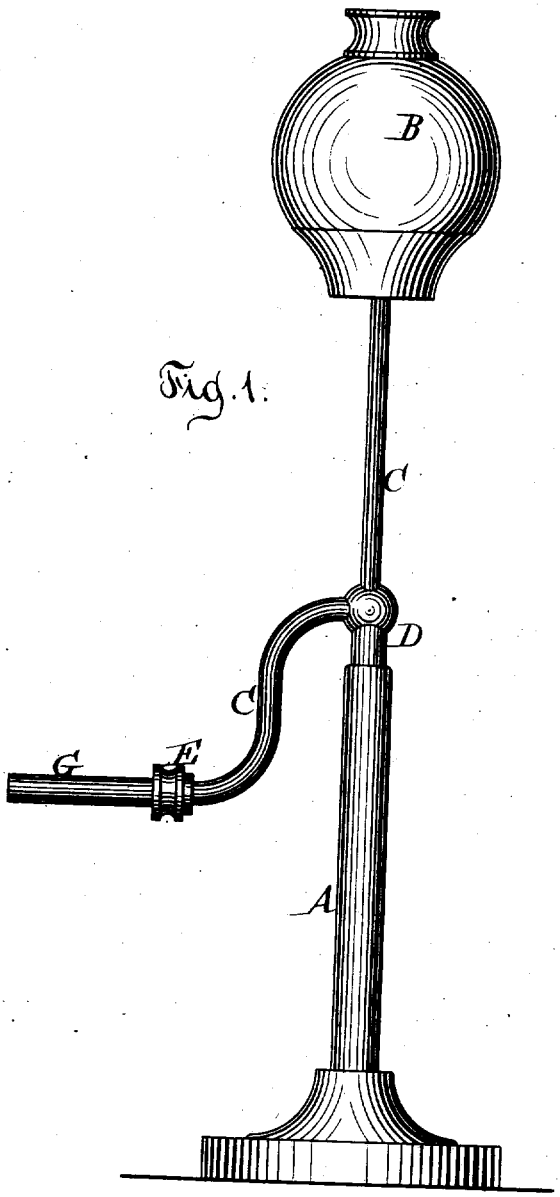
Figure 2:
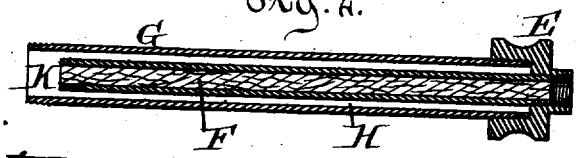

Figure 1 is a perspective view, and Fig. 2 is a sectional view, of my invention.

The nature of my invention consists in so constructing a generator for vapor-burners as to prevent the heat from charring the wick or packing.

Heretofore in vapor-burners the heat concentrated to such a degree at the point where the vaporization took place that the wick or packing was charred thereby. This caused sediment to deposit at this point, and in a short time the burner would be injured and the flame materially lessened. This was especially true where single tubes were used, and the present invention is intended to obviate this difficulty.

By my invention the heat is conducted back and distributed along the length of the generator.

In the drawings my generator is shown as attached to a lamp with reservoir above it; but I do not confine myself to any shaped lamp whatever, nor to any particular style of burner.

My generator may be used in connection with any kind of a vapor-burner adapted to the purpose.

To enable others skilled in the art to make and use my invention, I will proceed to describe its construction and use, reference being had to the accompanying drawings, where the same letters represent corresponding parts.

A represents the stand, B the reservoir, which may be in any of the usual forms. C is a hollow tube for the flow of oil to the generator. D is the connecting-joint, in which may be a cock to regulate the flow of the oil. As these form no part of my invention they need not be more fully described. They simply illustrate the flow of the oil to the generator; but the oil may be brought from a reservoir of any shape and situated anywhere below, or above, or on a line with, the generator.

In Fig. 2, which shows a sectional view of my generator, E is a sleeve, into which is screwed the tube G, and inside of the tube G is another or supplemental tube, F. This tube F may be termed the "packing-tube," being filled with wicking or other packing, whose function is to permit the passage of the oil in limited quantity to the point of vaporization, and to retard its excessive flow, as well as to prevent the back-pressure of the gas. Being of less diameter than the interior of the tube G, a space, H, is left between them, so that the wick or packing inside of the packing-tube F cannot become overheated by contact with the tube G. In this space H may collect from time to time carbon, and it being a non-conductor will effectually prevent the wick from becoming charred by overheating.

The sleeve E may be made of glass, porcelain, lead, or any other imperfect conductor; or any non-conducting insulator may be inserted between the tube G and the sleeve at the point of connection, thereby increasing its efficiency.

The operation of vaporization takes place at the end of the supplemental or packing tube F after the oil has passed through the packing in said wick-tube F on its way to the flame. At the end of this packing or supplemental tube there is a chamber, K, into which the vapor may pass or collect.

The operation of the entire construction is such that the oil passes from the reservoir through the usual tubes for that purpose either by flowing down or being otherwise forced to the generator. The oil then passes through the wick or packing in the generator, and as it emerges from this tube and wick it becomes vaporized at the air-chamber. On its way through the wick-tube the oil has become gradually heated by heat conducted along the outer tube surrounding the wick-tube.

The space between the outer and inner or wick tube will prevent the charring of the wick and yet allow the oil to be vaporized.

I do not claim the stand or the reservoir or the hollow tubes for conducting the oil, nor do I claim any particular form of burner; but What I do claim, and desire to secure by Letters Patent, is—

1. The outer tube or shield, in combination with the packing-tube in a generator for vapor-burners, the tubes having a space between them, and being arranged substantially as described, so that the heat for vaporizing the oil shall be conducted from the burner along the outer tube back of the point of vaporization, thus preventing concentration of heat at the immediate end of the packing-tube.

2. A generator for vapor-burners, consisting, essentially, of a packing-tube and an outer heat conducting and distributing tube separated from the packing-tube by an annular space or chamber, substantially as and for the purposes hereinbefore set forth.

3. In combination, the sleeve E, the packing-tube F, and the shield or outer tube, G, substantially as and for the purposes hereinbefore set forth.

WILLARD H. SMITH.

Witnesses:

JOSIAH T. LOVEJOY,
THOMAS E. BURNS.